Patented Aug. 17, 1937

UNITED STATES PATENT OFFICE 2,090,485

DIALKYLAMINOALCOHOLS

Granville A. Perkins, Charleston, and John H. Purse, South Charleston, W. Va., assignors, by mesne assignments, to Union Carbide and Carbon Corporation, a corporation of New York No Drawing. Application August 25, 1934, Serial No. 741,502

13 Claims. (Cl. 260—127)

The invention is a process for making dialkylaminoalcohols, particularly diethylaminoethanol. Broadly, the new process includes the reaction of monoalkylolamines with dialkyl sulfates followed by treatment with an alkali, all as hereinafter described in detail. For convenience, this invention will be specifically described with respect to the formation of diethylaminoethanol, but it is to be understood that it is by no means limited thereto.

Dialkylaminoalcohols are known, and they are useful in various ways. For example, diethylaminoethanol is a valuable intermediate in the preparation of certain substances having anesthetic properties. Previous investigators have synthesized diethylaminoethanol by employing the reaction of diethyl amine with ethylene oxide or ethylene chlorhydrin, and by reducing diethylamino acetic ester with metallic sodium and alcohol.

It is an object of this invention to provide a novel process for making dialkylaminoalcohols, especially diethylaminoethanol, which is simple and efficient in operation, and which employs commercially available starting materials.

In the preferred practice of this invention as applied to the production of diethylaminoethanol, one molecular equivalent of monoethanolamine is reacted with one molecular equivalent of diethyl sulfate. This results in a neutral addition product which is the ethyl hydrogen sulfate salt of monoethylaminoethanol. This compound is then treated with one molecular equivalent of alkali in aqueous solution to liberate the free amine and the ethyl sulfate salt of the alkali used. The free amine, monoethylaminoethanol, is not separated, but is immediately reacted with a second molecular equivalent of diethyl sulfate, and the ethyl hydrogen sulfate of diethylaminoethanol is formed. The desired amine is then liberated by treating the solution again with alkali. These reactions are represented by the following equations:

$H_2NC_2H_4OH + SO_4(C_2H_5)_2 =$
Monoethanol-   Diethyl
amine          Sulfate
   $C_2H_5NHC_2H_4OH.HSO_4C_2H_5$
   Monoethylaminoethanol
   ethyl hydrogen sulfate.

$C_2H_5NHC_2H_4OH.HSO_4C_2H_5 + NaOH =$
   $C_2H_5NHC_2H_4OH + NaSO_4C_2H_5 + H_2O$
   monoethyl         Sodium ethyl
   aminoethanol      sulfate $C_2H_5NHC_2H_4OH + SO_4(C_2H_5)_2 =$
   $(C_2H_5)_2NC_2H_4OH.HSO_4C_2H_5$
   diethylaminoethanol ethyl
   hydrogen sulfate $(C_2H_5)_2NC_2H_4OH.HSO_4C_2H_5 + NaOH =$
   $(C_2H_5)_2NC_2H_4OH + NaSO_4C_2H_5 + H_2O$
   diethylaminoethanol The process may also be carried out by utilizing both ethyl groups of a single molecular equivalent of diethyl sulfate, but this modification of the process requires more drastic conditions for the reaction, and results in the formation of undesirable by-products. In this variation of the process the reactions involved are:

$H_2NC_2H_4OH + SO_4(C_2H_5)_2 =$
   $(C_2H_5)_2NC_2H_4OH.HSO_4H$
   diethylaminoethanol
   hydrogen sulfate $(C_2H_5)_2NC_2H_4OH.HSO_4H + 2NaOH =$
   $(C_2H_5)_2NC_2H_4OH + Na_2SO_4 + 2H_2O$
   diethylamino-    Sodium sulfate
   ethanol In either case the diethylaminoethanol liberated by the treatment with alkali is separated by rapidly distilling the crude solution under reduced pressure. In order to keep in solution the sulfate or ethyl sulfate salts which are present, water is added to the mixture during distillation at about the same rate as distillate is removed. Diethylaminoethanol is extremely volatile in the presence of water, and practically all of this substance originally present will be obtained in the aqueous distillate.

From the aqueous solution resulting from this distillation, the free amine is obtained by adding to the solution a dehydrating liquid, and distilling out the water. The dehydrating liquid may be toluene, or some other water-immiscible liquid capable of forming relatively low boiling azeotropic mixtures with water, such as benzene or ethylene dichloride. During this distillation the dehydrating liquid is continuously separated from the aqueous condensate and returned to the amine mixture.

After the water has been removed, the mixture of amine and dehydrating liquid may be distilled under reduced pressure to separate the latter, and to purify the product.

In the same way, monoethanolamine can be reacted with dimethyl sulfate, diisopropyl or dipropyl sulfate, and other dialkyl sulfates to form a corresponding dialkylaminoethanol. Also, other monoalkylolamines, such as monoisopropanolamine or monobutanolamine, may replace the monoethanolamine used, and will result in the formation of other dialkylaminoalcohols. It is to be understood that both the monoalkylolamine and the dialkyl sulfate are of the lower aliphatic series.

The following example will illustrate one method of practicing the invention:

Three hundred sixty-six grams (6 moles) of monoethanolamine were placed in a flask equipped with a stirring device, dropping funnel and thermometer. This liquid was stirred and 924 grams (6 moles) of diethyl sulfate were added during the course of 30 minutes. External cooling was employed during this period to keep the temperature in the liquid at about 40° C. When the liquid was practically neutral, 240 grams (6 moles) of sodium hydroxide were added in the form of a 30% aqueous solution. This mixture was thereafter again treated with 6 moles of diethyl sulfate and 6 moles of sodium hydroxide in the manner just described.

The pressure on the flask was then reduced to about 100 mm. of mercury absolute, and the crude mixture was rapidly distilled. Water was added continuously at about the same rate as distillate was removed to prevent precipitation of sodium ethyl sulfate in the mixture. Samples of the distillate were titrated periodically with dilute hydrochloric acid, and the distillation was stopped when the sample contained less than 1% amine. The total distillate amounted to 3151 grams, and contained 501 grams of diethylaminoethanol.

Two hundred grams of toluene were added to this aqueous solution, and it was distilled through a rectifying column at atmospheric pressure. The toluene-water constant-boiling mixture was condensed in a separating chamber from which the water was removed, and the toluene was returned to the mixture being distilled. After the water was removed, the major portion of the toluene was distilled off at atmospheric pressure, and the residue was fractionated at low pressure.

A fraction of pure diethylaminoethanol was obtained boiling at 51° to 53° C. at 9 mm. of mercury. Additional amounts of the amine were contained in the toluene and water used, but these represent immaterial losses in cyclic operation of the process.

The foregoing example represents but one specific method of carrying out this invention, and various alternative procedures and conditions are possible. For example, the order of the addition of the original reactants may be reversed, and monoethanolamine may be added to the diethyl sulfate with equally good results. Also, the reaction may be carried out at temperatures ranging upward to about 200° C. Below about 20° C. the reaction is rather slow, and above about 50° C. undesirable side reactions may occur. Therefore, the preferred temperature range is from about 20° C. to about 50° C. Between about 100° C. and about 200° C., the second ethyl group of diethyl sulfate may be utilized, but by this means a less pure product is obtained. Instead of sodium hydroxide, other strong alkalies may be used, for example potassium hydroxide is fully suitable.

Distillation of the diethylaminoethanol from the crude reaction product should be carried out under a reduced pressure, such as about 100 mm. of mercury or less. This is necessary since at the temperatures required for distillation at higher pressures, reaction may occur between the diethylaminoethanol and the sulfate salt present.

In connection with this distillation of the crude product, it has been discovered that diethylaminoethanol is very volatile in the presence of water. Possibly this amine forms a constant-boiling mixture with water, for although this fact has not been heretofore known, it was found that these materials could not be separated by ordinary fractional distillation.

Other modifications of this process are possible and are included in the invention as defined by the appended claims.

What is claimed is:

1. Process for making dialkylaminoalcohols which comprises reacting a monoalkylolamine with a dialkyl sulfate, both reactants being of the lower aliphatic series.

2. Process for making dialkylaminoalcohols which comprises reacting a monoalkylolamine with a dialkyl sulfate, both reactants being of the lower aliphatic series and thereafter liberating the free amine by treatment of the reaction mixture with alkali.

3. Process for making dialkylaminoalcohols which comprises reacting a monoalkylolamine with a dialkyl sulfate, both reactants being of the lower aliphatic series, at temperatures from about 20° C. to about 200° C.

4. Process for making dialkylaminoalcohols which comprises reacting a monoalkylolamine with a dialkyl sulfate, both reactants being of the lower aliphatic series, in equimolecular proportions.

5. Process for making diethylaminoethanol which comprises reacting monoethanolamine with diethyl sulfate.

6. Process for making diethylaminoethanol which comprises reacting monoethanolamine with diethyl sulfate and thereafter liberating the free amine by treatment of the reaction mixture with alkali.

7. Process for making diethylaminoethanol which comprises reacting monoethanolamine with diethyl sulfate at temperatures from about 20° C. to about 200° C.

8. Process for making diethylaminoethanol which comprises reacting monoethanolamine with diethyl sulfate in equimolecular proportions.

9. Process for making diethylaminoethanol which comprises reacting monoethanolamine with diethyl sulfate in equimolecular proportions at temperatures between about 100° C. and about 200° C., and thereafter liberating the free amine by treatment of the reaction mixture with alkali.

10. Process for making diethylaminoethanol which comprises reacting one molecular equivalent of monoethanolamine with one molecular equivalent of diethyl sulfate at a temperature from about 20° C. to about 100° C., and thereafter introducing a second molecular equivalent of diethyl sulfate into the reaction.

11. Process for making dialkylaminoalcohols which comprises reacting one molecular equivalent of a monoalkyolamine with one molecular equivalent of a dialkyl sulfate, both reactants being of the lower aliphatic series; liberating the amine thereby formed by treatment of the reaction mixture with alkali; introducing a second molecular equivalent of dialkyl sulfate into the reaction; and liberating free dialkylaminoalcohol by treating the reaction mixture with alkali, the temperature during the said reactions being maintained from about 20° C. to about 100° C.

12. Process for making diethylaminoethanol which comprises reacting one molecular equivalent of monoethanolamine with one molecular equivalent of diethyl sulfate; liberating the amine thereby formed by treatment of the reaction mixture with alkali; introducing a second molecular equivalent of diethyl sulfate into the reaction;

and liberating free diethylaminoethanol by treating the reaction mixture with alkali, the temperature during the said reactions being maintained from about 20° C. to about 100° C.

13. Process for making diethylaminoethanol which comprises reacting one molecular equivalent of monoethanolamine with one molecular equivalent of diethyl sulfate; liberating the amine thereby formed by treatment of the reaction mixture with alkali; introducing a second molecular equivalent of diethyl sulfate into the reaction; and liberating free diethylaminoethanol by treating the reaction mixture with alkali, the temperature during the said reactions being maintained between about 20° C. and about 50° C.

GRANVILLE A. PERKINS.
JOHN H. PURSE.